June 26, 1956   W. A. YONKERS   2,752,219
DRAWER SLIDES

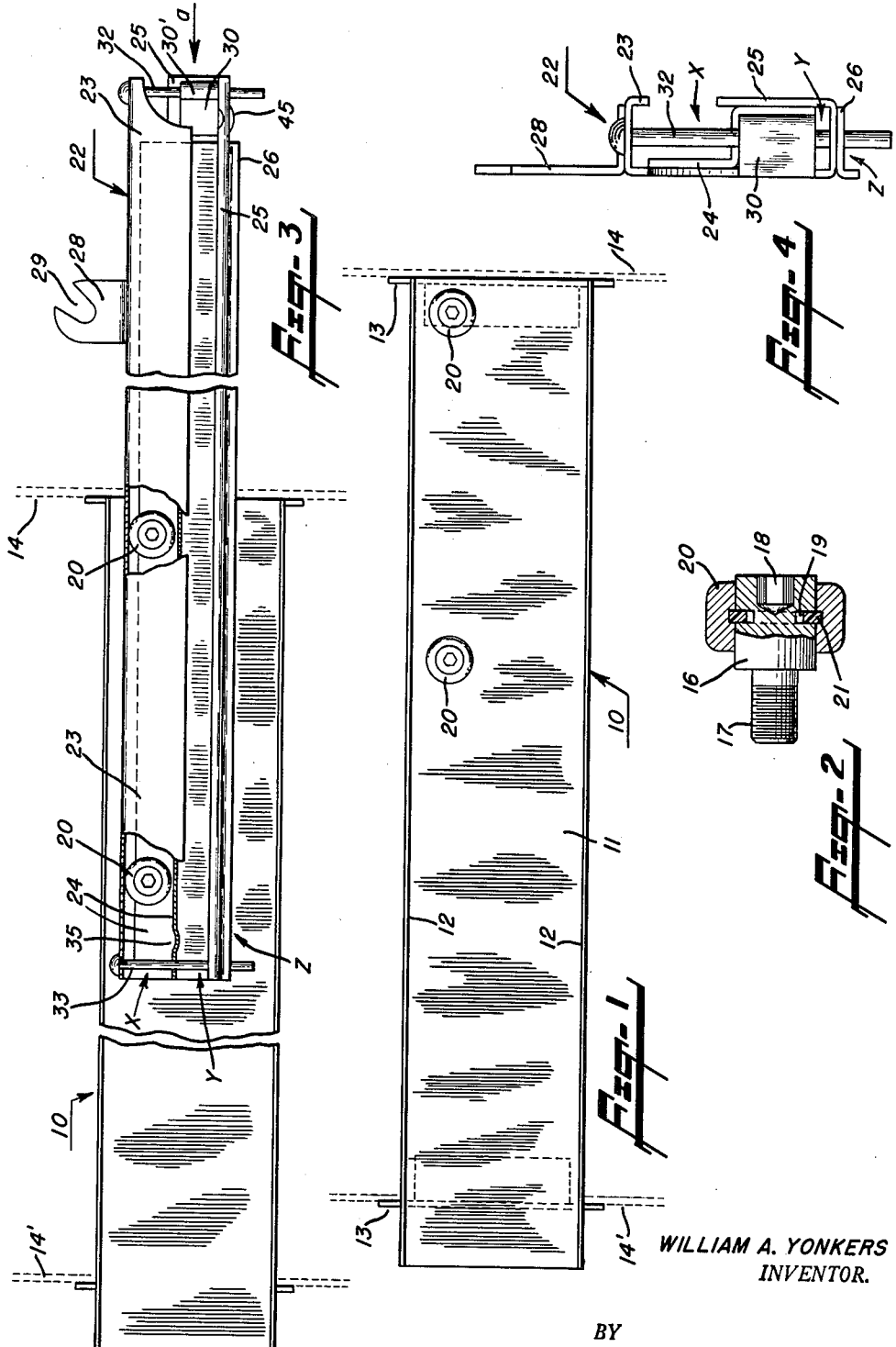

Filed April 15, 1954   3 Sheets-Sheet 2

WILLIAM A. YONKERS
INVENTOR.

BY
Rudolph J. Junick
ATTORNEY

June 26, 1956 W. A. YONKERS 2,752,219
DRAWER SLIDES

Filed April 15, 1954 3 Sheets-Sheet 3

WILLIAM A. YONKERS
INVENTOR.

BY
Rudolph J. Jmick
ATTORNEY

United States Patent Office 2,752,219
Patented June 26, 1956

2,752,219

DRAWER SLIDES

William A. Yonkers, Mountain Lakes, N. J., assignor to Radio Frequency Laboratories, Inc., Boonton, N. J., a corporation of New Jersey Application April 15, 1954, Serial No. 423,335

3 Claims. (Cl. 312—341)

This invention relates to drawer slides and more particularly to a slide-bar arrangement for the rack mounting of chassis of the type used in the electronic art.

In the electronic industry it is customary to support the various components, wiring, etc., on a metal chassis and to mount a plurality of such chassis between vertical angle bars generally referred to as a rack. In order to facilitate the inspection, testing and repairing of the electronic apparatus, the individual chassis are supported by slide-bars whereby a particular chassis may be pulled forward of the rack much in the manner of conventional filing cabinets. In such arrangements, a stop means is provided to limit the forward sliding movement of the chassis and thereby prevent the accidental dropping of the chassis. Also, there is provided a pivoted means whereby the chassis may be tilted while yet retained on the slide-bars to thereby afford ready access to the components disposed on the underside of the chassis. Numerous slide-bar constructions of this character have heretofore been proposed but these are of complex construction, expensive and subject to certain undesirable limitations in use.

An object of this invention is the provision of slide-bars for mounting chassis on a rack and which slide bars are of simple, rugged construction, economical to produce and having a long trouble-free operating life.

An object of this invention is the provision of a slide-bar arrangement made of pressed metal parts and including load bearing members arranged to distribute the load represented by the chassis and its contents.

An object of this invention is the provision of a slide-bar for use in supporting a chassis on vertical bars and comprising an elongated member adapted to be affixed to the bars, a pair of roller bearings carried by the elongated member, a track member slidable within the first elongated member and including a first runway for the said pair of bearings, a second runway in the track member, and a roller bearing operative in the said second runway and adapted to be secured to a side wall of the chassis.

An object of this invention is the provision of an arrangement for slidably supporting a chassis between vertical bars, said arrangement comprising a first pair of track members secured to the bars, a second pair of track members longitudinally slidable within the first members, removable stop means limiting the extent of relative movement between the associated track members, bearing means operative within a runway formed in the second track members and adapted to be secured to opposite side walls of the chassis, means normally limiting the linear movement of the bearing means, and means including certain of the said bearing means affording rotational movement of the chassis relative to the track members, and means effective upon rotation of the chassis to support the chassis in a tilted position.

An object of this invention is the provision of an assemblage comprising a chassis having side walls, a pair of identical track members disposed adjacent opposite side walls of the chassis and including an upper runway and a lower runway, a pair of alined rollers carried by the opposite side walls of the chassis and linearly movable in the lower runway of the associated track member, removable stop means limiting the extent of such linear movement of the rollers, a pair of channel members individually associated with the track members, and adapted to be secured to a fixed support, a pair of longitudinally-alined rollers carried by each channel member and operative in the upper runway of the associated track member, and stop means limiting the movement of the rollers within the upper runway.

These and other objects and advantages will become apparent from the following description when taken with the accompanying drawings. It will be understood that the drawings are for purposes of illustration and are not to be construed as defining the scope or limits of the invention, reference being had for the latter purpose to the claims appended hereto.

In the drawings wherein like reference characters denote like parts in the several views:

Figure 1 is a side elevation of the outer track member which is adapted for fastening to the vertical bars forming the rack;

Figure 2 is an enlarged view, in partial section, showing the construction of the roller bearings;

Figure 3 is similar to Figure 1 and showing the assembly of the inner and outer track members to form one slide-bar set;

Figure 4 is an end view of the inner track member drawn to an enlarged scale;

Figure 5:
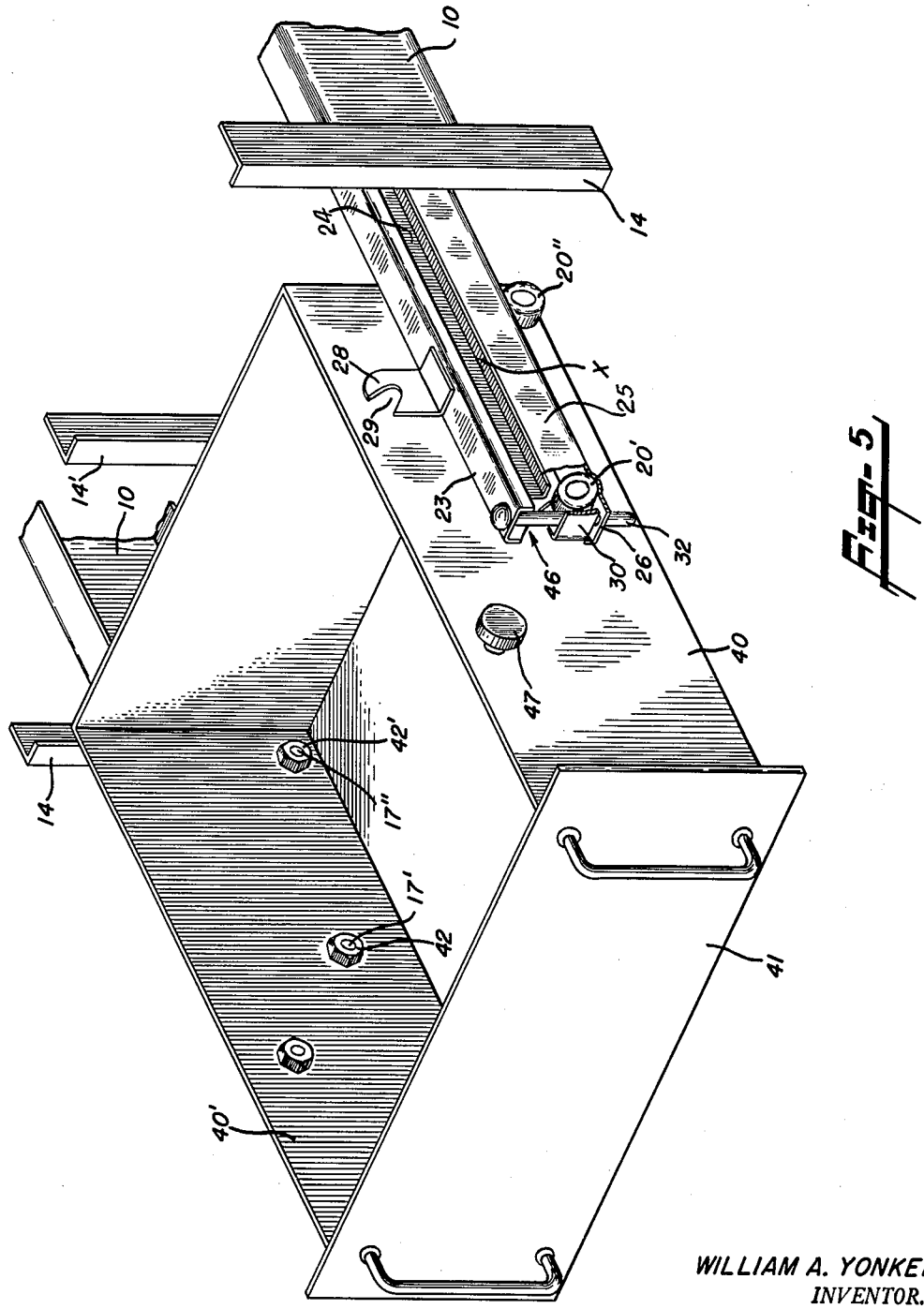
Figure 5 is a fragmentary view, in perspective, showing a chassis supported on a rack by the slide-bars.

Reference is now made to Figure 1 which shows the outer track member 10 made of pressed metal of suitable thickness. This member is, simply, a U-shaped, open channel comprising the base portion 11 terminating in the upturned sides 12. Secured to the base portion and on the rear surface thereof, as by welding, are a pair of L-shaped mounting brackets 13 by means of which the channel member 10 can be secured in rigid position to two, spaced, vertical bars 14, 14' here shown in dotted outline. These bars constitute part of a rack and the brackets can be secured thereto by any suitable means as by welding or by screws and nuts. The point here being made is that in normal use of my slide-bar arrangement the member 10 remains fixed with respect to the rack.

Reference for the moment is made to Figure 2 which is an enlarged view, with parts in section, showing the construction of the roller bearings employed in my device. Such bearing comprises a metal stud 16 having a reduced diameter end 17 that is threaded to receive a fastening nut. The opposite end of the stud is provided with a hexagonal recess 18 to receive a conventional socket wrench and a circumferential groove 19 is provided in the stud body. A metallic roller 20, having an axial bore of a diameter somewhat larger than the outside diameter of the stud 16, is provided with an interval groove corresponding to that formed in the stud. These rectangular, complementary grooves form a raceway for the split ring 21 which has a rectangular cross section and preferably is made of nylon since such material is tough and needs no oiling. In assembling the bearing, the split ring is pressed entirely within the stud groove 19 and the roller 20 slipped over the stud. When the two grooves fall into radial alinement the ring 21 spreads outwardly thereby retaining the stud and roller in fixed, operative assembly.

Referring again to Figure 1, two roller bearings are secured to the base portion 10 of the member with the rollers 20 disposed forwardly between the upturned side walls 12, as shown. These two rollers support the inner track member as will now be described with specific reference to Figures 3 and 4, it here being pointed out that Figure 4 is an end view of the inner track member as viewed in the direction of the arrow *a* and drawn to an enlarged scale.

The inner track member 22 is made up principally of four, elongated, pressed metal frame members 23, 24, 25 and 26 welded together to form a rugged unit. Such construction results in three runways X, Y and Z, the former two being substantially closed and the latter being substantially open, all for purposes which will become apparent as the description proceeds. Welded to the upper surface of the member 23 is an L-shaped catch 28 having a tapered notch 29 and which forms a rest for the chassis when the latter is in the tilted position as will be explained hereinbelow with reference to Figures 5 and 6. Further, the forward end of the runway Y is closed off by a small plate 30 that is welded to the base portion of the member 24, extends laterally across the runway and includes a reversely-bent end portion 30'. A headed pin 32 extends loosely through alined holes formed in the front end of the track member and a similar pin 33 likewise is disposed at the rear of the member. To facilitate a thorough understanding of the construction of the front end of the inner track member, reference is made to Figure 5 which clearly shows the shape and relative disposition of the plate 30, the pin 32 and the catch 28.

The runway X of the inner track member, is dimensioned to loosely accommodate the rollers 20 carried by the outer channel member 10. A study of Figure 3 will show that upon removal of the front stop pin 32 the track member 22 can be entirely separated from the channel member 10 by merely sliding the inner member to the left until it is clear of both of the rollers 20. The units are assembled together in a reverse manner. It will also be clear that the extent of the forward sliding movement of the track member is limited by the pin 33 which strikes the left roller 20. When the two members are in what may be termed the closed position, the load of the inner track member is carried by the rollers 20 through the upper wall of the frame member 23. When, however, the inner track member is moved outwardly of the channel member, the weight of the extended track will cause a clockwise rotation of the inner track about the right roller 20 whereupon the central wall of the member 24 will press upwardly against the left roller. Such shifting of the load is, of course, accentuated when a chassis is carried by the inner track member. Eventually, when the inner track member is fully extended, the left roller will fall within the notch, or depression, 35 formed in the horizontal wall of the frame member 24. It will be apparent, therefore, that the inner track member cannot be withdrawn completely from the outer track member except upon removal of the pin 33 and that the depression 35 serves as an index to prevent inward movement of track member 22 unless a positive force is applied to the latter to move the left roller out of the depression. The latter feature prevents an undesirable inward, sliding movement of the chassis as work is being done on the components or circuitry carried thereon. Two, relatively-slidable assemblies, as shown in Figure 3, constitute a set of slide-bars for supporting the chassis on the rack.

Figure 6:
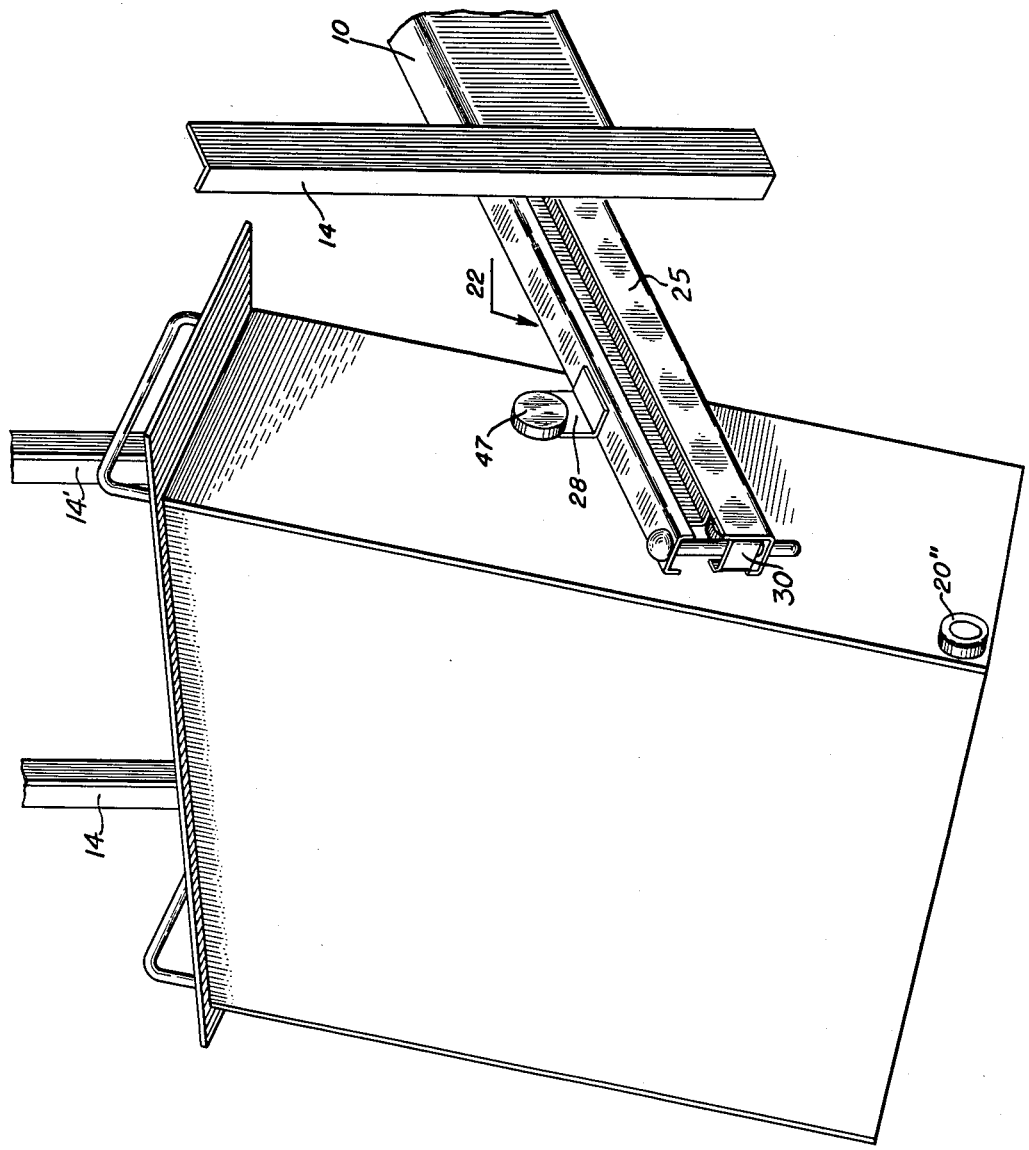
Figure 6 is a similar view showing the chassis tilted to afford ready access to those components carried on the chassis bottom.

Reference is now made to Figure 5. Here are shown the front, vertical bars 14 and one of the rear bars, 14' of the rack. As has been explained with reference to Figures 1 and 3, the channel members 10 are rigidly secured to the rack bars and disposed in a horizontal position. The inner track members, 22 slide in and out of the associated channel members on the rollers operating in the runway X. Secured to the right side wall 40 of the chassis 41 are two rollers 20', 20'', the former operating in the runway Y and the latter in the runway Z, see also Figure 4. The roller 20' is secured to the chassis at a point somewhat to the rear of the median vertical plane passing through the chassis, and the roller 20'' is secured at the lower rear corner, as shown. A similar set of identically-positioned rollers are carried by the opposite chassis side wall 40', the corresponding threaded shanks 17', 17'' and fastening nuts 42, 42' being visible in the drawings. The shanks or shafts 17', which carry the rollers 20', extend through longitudinal slots coextensive with the runways Y, and which are defined by the lower edges of the members 23 and the upper edges of those parts of the members 25 directly therebeneath. The alined chassis rollers 20' form an axis about which the chassis may be rotated and since such axis is displaced from the center line of the chassis, the latter will tend to rotate in a counter-clockwise direction, with reference to Figure 5. Such chassis rotation is prevented by the alined rollers 20'' which press upwardly against the frame member 26 of the inner track member.

As shown in Figure 5, the chassis is in the fully extended position with the forward, alined rollers 20' resting in associated depressions formed in the frame member 25, such depression 45 being shown in Figure 3. I have already explained how the depression 35, Figure 3, serves as an index to retain the track member 22 in the fully extended position relative to the associated channel member 10. Consequently, when the chassis is in the extended position shown in Figure 5 it effectively is locked in such position; that is, the chassis will not slide inwardly by reason of the normal forces applied to the chassis during such work as may be done on the chassis or its contents. To slide the chassis back to its normal, closed position relative to the rack, the operator lifts the front end of the chassis slightly so that the forward chassis rollers 20' clear the associated depressions in the runways after which the cooperating chassis rollers 20', 20'' roll within their respective runways. When the lateral extensions of the front panel of the chassis 41 strike the ends of the inner track members such members, and the chassis move as a unit inwardly of the fixed channel members 10 until such panel extensions abut the bars 14.

In order to completely disengage the chassis from the track members, the stop pins 32 are removed, whereupon the chassis rollers 20' can be withdrawn from the inner track members by simply raising the front end of the chassis until the rollers 20' clear the frame end pieces 30, it being noted that the side wall of the frame member 23 is provided with an arcuate slot 46 to accommodate the shank of the associated roller 20' during such vertical and forward movement of these rollers. Once the alined chassis rollers 20 are clear of the associated runways the chassis is completely disengaged from the slide-bars. A reverse procedure is followed to operatively couple the chassis to the slide-bars.

Chassis of the type used in the electronic art generally carry electronic components on the upper and lower surfaces of a sub-panel disposed intermediate of the chassis side walls. To facilitate access to the underside of the sub-panel it is desirable to provide some means whereby the chassis may be tilted when in the fully extended position shown in Figure 5. Bearing in mind that the alined chassis rollers 20 rest in associated depressions 45, formed in the frame members 25, it will be clear that the chassis can be rotated in a clockwise direction about the rotational axis formed by these rollers and without fear of a simultaneous linear movement of these rollers in their associated runways. A pair of alined stops 47 (only one of which is visible) are secured to the opposite side walls of the chassis, each such stop having a reduced-diameter section adjacent the chassis wall and which is adapted to fit within the slot 29, in one of the catches 28, when the chassis is rotatably tilted to the position shown in Figure 6. Since the stops 47 are disposed between the front of the chassis and the rollers 20′, the chassis is tilted beyond the vertical plane and, therefore, is supported in a stable position.

From the above description of the invention, the structural and functional advantages of my slide-bar arrangement will be appreciated by those skilled in this art. The component parts forming the relatively slidable members are made of pressed metal rather than castings and, therefore, result in a rugged, low-cost device. The chassis load is distributed among eight roller bearings whereby even relatively heavy chassis require only a light force to produce the sliding movement. Simple means are provided to permit a tilting of the chassis or disengagement from the slide-bars. Further, effective means are provided to retain the chassis effectively locked in the fully extended position.

Having now described my invention in detail in accordance with the Patent Statutes what I desire to protect by Letters Patent of the United States is set forh in the following claims.

I claim:

1. An arrangement for slidably mounting on a vertical rack a chassis having side walls, said arrangement comprising a pair of U-shaped elongated channel members secured in spaced parallel position on the rack, a pair of longitudinally-spaced channel rollers associated with each channel, said rollers being rotatable about individual shafts secured to the webs of the channel members, an elongated track member slidable within each channel member, each track member comprising a generally Z-shaped member with its web disposed horizontally, a generally L-shaped member, the vertical element of which is secured to the lower flange of said Z-shaped member, a first generally inverted L-shaped member, the horizontal element of which is secured to the lower element of said generally L-shaped member, a second generally inverted L-shaped member the lower element of which is secured to the upper flange of said Z-shaped member, with its upper element forming an upper runway engaged by said channel rollers, the upper surface of the horizontal flange of said L-shaped member forming an intermediate runway and the lower surface of the first inverted L-shaped member forming a lower runway, each of said runways being continuous and extending substantially the full length of its track member, aligned main rollers rotatable about individual shafts extending from opposite sides of the chassis, each of said main rollers being rotatable on an intermediate runway, a pair of aligned supporting rollers rotatable about individual shafts extending from opposite sides of said chassis, each of said supporting rollers being rotatable on the lower runway of the associated track member and swingable from engagement therewith about the axis of the main rollers to present to view the lower side of said chassis, first stop pins loosely disposed within aligned holes at the front end of each track member, and second stop pins loosely disposed within aligned holes formed in the rear ends of each track member, said first and second stop pins effectively closing off the runways.

2. An arrangement for slidably mounting on a vertical rack a chassis having side walls, said arrangement comprising a pair of elongated channel members secured in spaced parallel position on the rack, a pair of longitudinally spaced channel rollers associated with each channel, said rollers being disposed between the flanges of said channel members and rotatable about individual shafts secured to the webs of the channel members, an elongated track member slidable within each channel member, each track member comprising a structure consisting of a top generally horizontal flange forming an upper runway the lower surface of which is engaged by said channel rollers, a flange therebeneath forming a top surface intermediate runway and an angle iron with a generally horizontal upper flange secured to the lower surface of said second-mentioned flange and forming a bottom surface lower runway, each of said runways being continuous and extending substantially the full length of its track member, aligned main rollers rotatable about individual shafts extending from opposite sides of the chassis, each of said main rollers being rotatable on an intermediate runway, a pair of aligned supporting rollers normally disposed below said main rollers and rotatable about individual shafts extending from opposite sides of said chassis, each of said supporting rollers being rotatable on the lower surface of the upper flange of said angle iron of the associated track member and swingable with the chassis from engagement therewith about the axis of the main rollers beyond the lower flange of said angle iron to present to view the lower side of said chassis, and means at the ends of each track member effectively closing off the runways.

3. The invention as defined in claim 2, in which the chassis also has a stop extending from each of its sides, and the top flange of each track member has an angular catch, the lower flange of which is secured thereto and the other flange of which upstands therefrom and is provided with a slot formed to receive the corresponding stop to limit swinging, when the chassis is rotated about the axis of the main rollers to present to view its lower side, the positioning of the main rollers being such that after reception of the stops in said catches, the chassis tends to stay in such position.

References Cited in the file of this patent
UNITED STATES PATENTS

| | | |
|---|---|---|
| 800,040 | Wilmot | Sept. 19, 1905 |
| 1,454,494 | Thomas | May 8, 1923 |
| 2,559,380 | Wikman | July 3, 1951 |
| 2,565,784 | Sheean | Aug. 28, 1951 |
| 2,614,022 | Kurtzon | Oct. 14, 1952 |
| 2,630,364 | Gleason | Mar. 3, 1953 |